Nov. 6, 1945. F. R. HIGLEY Re. 22,688
THERMAL RESPONSIVE DEVICE
Original Filed April 19, 1941
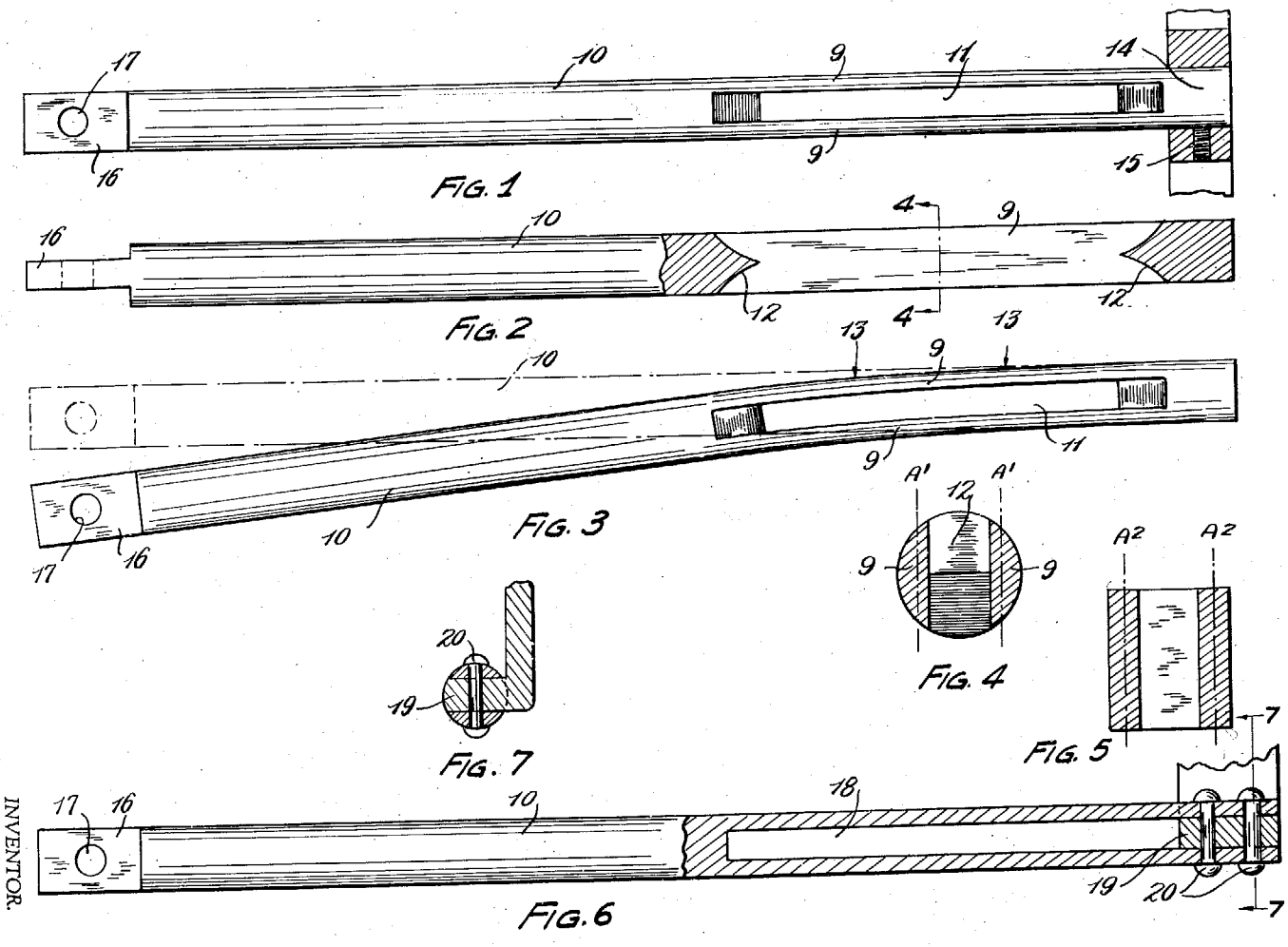
INVENTOR.
FRANK R. HIGLEY
BY Kuris Hudson & Kent
ATTORNEYS Reissued Nov. 6, 1945

Re. 22,688

UNITED STATES PATENT OFFICE 22,688

THERMAL RESPONSIVE DEVICE

Frank R. Higley, Cleveland Heights, Ohio, assignor to The Bryant Heater Company, Cleveland, Ohio, a corporation of Ohio Original No. 2,290,963, dated July 28, 1942, Serial No. 389,401, April 19, 1941. Application for reissue July 24, 1943, Serial No. 496,095

4 Claims. (Cl. 297—11)

This invention relates to improvements in compensated thermostatic elements, that is to say thermostatic elements which are independent of ambient temperature and dependent for actuation upon the application of localized heat. Thermostatic elements of this character are commonly employed in connection with pilot controls for fluid burners, being responsive to heat from the pilot to operate a valve, an electric switch or other shiftable control member.

One of the objects of the invention is the provision of a thermostatic element of this kind which may be formed from regular stock material at a minimum of expense.

Another object is the provision of a thermostatic element of the character described which shall have a relatively large flexure under the influence of applied heat and shall thereby be adaptable to a widened range of applications.

Other objects and features of novelty will appear as I proceed with the description of those embodiments of the invention which, for the purposes of the present application, I have illustrated in the accompanying drawing in which:

Fig. 1 is a plan view of a thermostatic element embodying the invention;

Fig. 2 is a side elevation of the same, portions being shown in longitudinal section;

Fig. 3 is a view similar to Fig. 1 but showing the element under flexure, the degree of flexure being exaggerated in order to more fully illustrate the invention;

Fig. 4 is a transverse section taken on the line 4—4 of Fig. 2;

Fig. 5 is a transverse section of a modified form of the invention;

Fig. 6 is a plan view of another modified form, and

Fig. 7 is a detail sectional view taken substantially on the line 7—7 of Fig. 6.

Compensated thermal elements as heretofore produced and used have been constructed in some cases of flat plates or strips of material provided with perforations extending lengthwise of the element so as to interfere with the transmission of heat crosswise of the strip. Such an element flexes in a direction parallel to its greater cross-sectional dimension and is adapted to perform relatively heavy work, but it has a stroke of very limited extent. The thermostatic element of the present invention on the other hand has a relatively long stroke, but its flexure takes place in a plane at right angles to its greatest cross-sectional dimension and the element is therefore able to exert less force than the flat strip elements now in more or less common use.

In Figs. 1, 2, and 3 of the drawing I have shown a thermostatic element 10 formed from a length of solid rod which is circular in cross-section. The circular cross-section is utilized partially because it is a common commercial product, although there is a further reason as will presently appear. The material best suited for the purpose is a high quality stainless steel, since it is important that the element be capable of resisting corrosion and of maintaining its elasticity indefinitely under repeated heating to a comparatively high temperature.

As illustrated in these figures the rod is provided near one end with a longitudinal slot 11 which is formed preferably by a milling cutter that is caused to make a cut part way through the rod after which the rod is turned over and a cut is taken from a point opposite the first cut. In this manner tapered ends 12 are formed at the extremities of the slot, thereby eliminating the weak spots which would otherwise be presented by the junction of the slotted and solid parts, and reducing possible breakage. With respect to cross-sectional dimensions, the slot 11 is shown centered midway of the rod, but it may be desirable in some instances to offset it from the median position. Its length may be varied. The parallel members formed by the slot are marked 9 in the drawing.

Points at which heat may be applied to the rod on one side of the slot are indicated by the arrows 13 in Fig. 3. However, a single flame may be used instead of two flames, or the number may be increased to three or more. Obviously, variations in the length of slot used may call for a variation in the number of flames employed. In any case to get maximum deflection of the rod it should be heated more or less evenly along one of the walls opposite the slot. The number and size of the flames will naturally be regulated to produce a maximum effect throughout the length of the slotted portion.

One end of the rod is fixed as indicated at 14 in the drawing, a set screw being illustrated for the purpose at 15. The other end of the rod may be formed for a convenient connection with some suitable control element. As shown herein, I may cut away opposed surfaces to form a flat extremity 16 and may bore a hole therethrough for a pivot pin or the like, not shown, to constitute part of the control connections. When heat is applied as at points 13 in Fig. 3 to one member of the rod, that member expands and puts a curve into that portion of the rod, which accomlishes a deflection of the free end as indicated to an exaggerated degree in the drawing.

Fig. 4 shows a cross-section of a rod like that of Figs. 1 to 3, inclusive. The member or wall portion on each side of the slot is a segment of a circle. The mass in each segment is equally divided by an axis $A^1$ which is closer to the inner wall of the segment than to its outermost point. In Fig. 5 where the cross-section of a rectangular rod is shown, the masses in the members on opposite sides of the slot are divided equally by axis lines $A^1$ and $A^2$. If the width of the rod of Fig. 5 is the same as the diameter of the rod of Fig. 4, the lines $A^2$ will we further apart than the lines $A^1$. The mean flexure of each wall portion takes place in what are originally planes through these lines $A^1$ and $A^2$. Since the distance between the lines $A^1$ is less than that between the lines $A^2$, the flexure of the round rod will be sharper or on a smaller radius than that of the rectangular rod. Hence the round rod presents some advantages over the rectagular one. The width of the slot as compared with the diameter or width dimension of the rod may be varied more or less.

The construction of Fig. 6 differs from that of Figs. 1 to 3 in that the slot 18 is cut through one end of the rod and the members on opposite sides of the slot are caused to straddle a mounting projection 19 to which the members may be welded, or if preferred, the projection may be drilled to receive rivets 20 or the like extending through aligned holes in the rod walls, as illustrated in the drawing.

Having thus described my invention, I claim:

1. A thermally responsive device comprising a metal rod having a solid portion and a portion provided with a longitudinal slot, whereby the application of heat to the rod on one side of said slot will cause flexure of the rod, the junction of said solid and slotted portions having a gradually varying cross sectional area, whereby the localization of stresses at the said junction will be minimized.

2. A thermally responsive device comprising a metal rod having a longitudinal slot therethrough extending from one end of the rod to a point substantially removed from the opposite end thereof, leaving a pair of leg members disposed alongside each other on opposite sides of said slot, and bracket means interposed between the leg members at the first named end of the device and secured thereto for mounting them in spaced relation.

3. A thermally responsive device comprising a metal rod symmetrical about a plane through its axis, having a longitudinal slot therethrough extending along said plane from one end of the rod and terminating at a point substantially removed from the other end to provide two similar leg members projecting from and integral with the solid end portion, and mounting means at the outer ends of said leg members, said members being secured to said mounting means, whereby the device is rigidly supported and movement will result from a difference in temperature between the two members.

4. A thermally responsive device comprising a metal rod having a longitudinal slot therethrough extending from one end of the rod and terminating at a point substantially removed from the other end, leaving two integral parallel members projecting from and integral with the solid end portion, one on each side of the slot, mounting means filling the slot between the outer ends of said parallel members, and means for fastening said members to said mounting means, whereby the device is rigidly supported and flexure will result from a difference in temperature between the two members.

FRANK R. HIGLEY.